US009911403B2

(12) United States Patent
Sung et al.

(10) Patent No.: US 9,911,403 B2
(45) Date of Patent: Mar. 6, 2018

(54) AUTOMATED GENERATION OF COORDINATED AUDIOVISUAL WORK BASED ON CONTENT CAPTURED GEOGRAPHICALLY DISTRIBUTED PERFORMERS

(71) Applicant: SMULE, INC., San Francisco, CA (US)

(72) Inventors: Kevin Sung, Foster, CA (US); Bona Kim, San Francisco, CA (US); Jon Moldover, San Francisco, CA (US); John Shimmin, San Francisco, CA (US); Jeannie Yang, San Francisco, CA (US); Perry R. Cook, Jacksonville, OR (US)

(73) Assignee: Smule, Inc., San Francisco, CA (US)

( * ) Notice: Subject to any disclaimer, the term of this patent is extended or adjusted under 35 U.S.C. 154(b) by 0 days.

(21) Appl. No.: 15/173,041

(22) Filed: Jun. 3, 2016

(65) Prior Publication Data
US 2016/0358595 A1 Dec. 8, 2016

Related U.S. Application Data

(60) Provisional application No. 62/170,255, filed on Jun. 3, 2015.

(51) Int. Cl.
*G11B 27/00* (2006.01)
*G10H 1/36* (2006.01)
*G11B 27/02* (2006.01)

(52) U.S. Cl.
CPC .......... *G10H 1/368* (2013.01); *G10H 1/366* (2013.01); *G11B 27/02* (2013.01);
(Continued)

(58) Field of Classification Search
CPC ... G11B 27/034; G11B 2220/90; G11B 27/34; G11B 27/105; H04N 9/8042
(Continued)

(56) References Cited

U.S. PATENT DOCUMENTS 7,853,342 B2 * 12/2010 Redmann ............ G10H 1/0058
 700/94
8,983,829 B2 3/2015 Cook et al.
(Continued)

OTHER PUBLICATIONS

PCT International Search Report /Written Opinion of International Search Authority for counterpart application, dated Oct. 17, 2016, of PCT/US2016/035810.

*Primary Examiner* — William C Vaughn, Jr.
*Assistant Examiner* — Daniel Tekle
(74) *Attorney, Agent, or Firm* — Haynes and Boone, LLP

(57) ABSTRACT

Vocal audio of a user together with performance synchronized video is captured and coordinated with audiovisual contributions of other users to form composite duet-style or glee club-style or window-paned music video-style audiovisual performances. In some cases, the vocal performances of individual users are captured (together with performance synchronized video) on mobile devices, television-type display and/or set-top box equipment in the context of karaoke-style presentations of lyrics in correspondence with audible renderings of a backing track. Contributions of multiple vocalists are coordinated and mixed in a manner that selects for presentation, at any given time along a given performance timeline, performance synchronized video of one or more of the contributors. Selections are in accord with a visual progression that codes a sequence of visual layouts in correspondence with other coded aspects of a performance score such as pitch tracks, backing audio, lyrics, sections and/or vocal parts.

24 Claims, 9 Drawing Sheets

(52) U.S. Cl.
CPC . *G10H 2210/331* (2013.01); *G10H 2220/005* (2013.01); *G10H 2220/011* (2013.01); *G10H 2220/355* (2013.01); *G10H 2230/015* (2013.01); *G10H 2240/175* (2013.01); *G10H 2240/251* (2013.01)

(58) Field of Classification Search
USPC .......................................................... 386/274
See application file for complete search history.

(56) References Cited

U.S. PATENT DOCUMENTS

| | | |
|---|---|---|
| 9,147,385 B2 | 9/2015 | Salazar et al. |
| 9,324,330 B2 | 4/2016 | Chordia et al. |
| 2002/0082731 A1 | 6/2002 | Pitman et al. |
| 2011/0154197 A1 | 6/2011 | Hawthorne et al. |
| 2013/0006625 A1 | 1/2013 | Gunatilake et al. |
| 2013/0254231 A1 | 9/2013 | Decker et al. |
| 2014/0229831 A1 | 8/2014 | Chordia et al. |
| 2015/0279427 A1 | 10/2015 | Godfrey et al. |
| 2016/0057316 A1 | 2/2016 | Godfrey et al. |

\* cited by examiner

SINGLE PERFORMER LAYOUT

SIX (6) PERFORMER LAYOUT

EIGHT (8) PERFORMER LAYOUT

COORDINATED AV PERFORMANCE TIMELINE 130

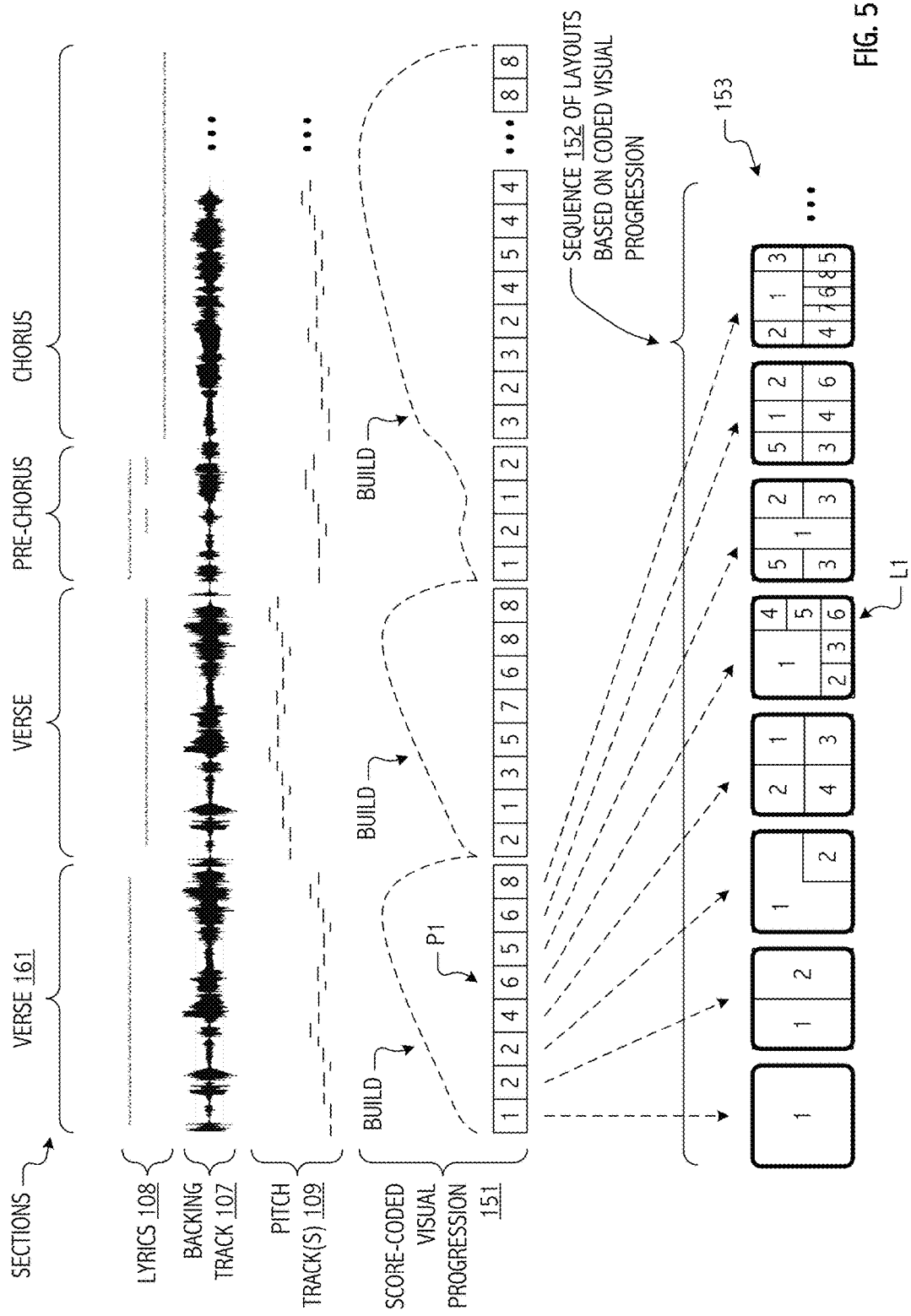

AUTOMATED GENERATION OF COORDINATED AUDIOVISUAL WORK BASED ON CONTENT CAPTURED GEOGRAPHICALLY DISTRIBUTED PERFORMERS

CROSS-REFERENCE TO RELATED APPLICATION(S)

The present application claims priority of U.S. Provisional Application No. 62/170,255, filed Jun. 3, 2015.

BACKGROUND

Field of the Invention

The invention relates generally to capture and/or processing of audiovisual performances and, in particular, to techniques suitable for use in connection with portable device implementations of vocal performance capture.

Description of the Related Art

The installed base of mobile phones and other portable computing devices grows in sheer number and computational power each day. Hyper-ubiquitous and deeply entrenched in the lifestyles of people around the world, they transcend nearly every cultural and economic barrier. Computationally, the mobile phones of today offer speed and storage capabilities comparable to desktop computers from less than ten years ago, rendering them surprisingly suitable for real-time sound synthesis and other musical applications. Partly as a result, some modern mobile phones, such as iPhone® handheld digital devices, available from Apple Inc., support audio and video playback quite capably.

Like traditional acoustic instruments, mobile phones can be intimate sound producing and capture devices. However, by comparison to most traditional instruments, they are somewhat limited in acoustic bandwidth and power. Nonetheless, despite these disadvantages, mobile phones do have the advantages of ubiquity, strength in numbers, and ultra-mobility, making it feasible to (at least in theory) bring together artists for performance almost anywhere, anytime. The field of mobile music has been explored in several developing bodies of research. Indeed, recent experience with applications such as the Smule Ocarina™, Smule Magic Piano, and Smule Sing! Karaoke™ (all available from Smule, Inc.) has shown that advanced digital acoustic techniques may be delivered in ways that provide a compelling user experience.

As digital acoustic researchers seek to transition their innovations to commercial applications deployable to modern handheld devices such as the iPhone® handheld and other platforms operable within the real-world constraints imposed by processor, memory and other limited computational resources thereof and/or within communications bandwidth and transmission latency constraints typical of wireless networks, significant practical challenges present. Improved techniques and functional capabilities are desired, particularly relative to video.

SUMMARY AND DESCRIPTION

It has been discovered that, despite many practical limitations imposed by mobile device platforms and application execution environments, audiovisual performances, including vocal music, may be captured and coordinated with those of other users in ways that create compelling user experiences. In some cases, the vocal performances of individual users are captured (together with performance synchronized video) on mobile devices in the context of a karaoke-style presentation of lyrics in correspondence with audible renderings of a backing track. In some cases, pitch cues may be presented to vocalists in connection with the karaoke-style presentation of lyrics and, optionally, continuous automatic pitch correction (or pitch shifting into harmony) may be provided.

Vocal audio of a user together with performance synchronized video is captured and coordinated with audiovisual contributions of other users to form composite duet-style or glee club-style or window-paned music video-style audiovisual performances. In some cases, the vocal performances of individual users are captured (together with performance synchronized video) on mobile devices, television-type display and/or set-top box equipment in the context of karaoke-style presentations of lyrics in correspondence with audible renderings of a backing track. Contributions of multiple vocalists are coordinated and mixed in a manner that selects for presentation, at any given time along a given performance timeline, performance synchronized video of one or more of the contributors. Selections are in accord with a visual progression that codes a sequence of visual layouts in correspondence with other coded aspects of a performance score such as pitch tracks, backing audio, lyrics, sections and/or vocal parts.

In some embodiments of the present invention, a method of preparing a coordinated audiovisual work from geographically distributed performer contributions includes receiving via a communication network, plural audiovisual encodings of performances captured at respective remote devices in temporal correspondence with respective audible renderings of a seed, the received audiovisual encodings each including respective performer vocals and temporally synchronized video; retrieving a visual progression that encodes, in temporal correspondence with the seed, a succession of templated screen layouts each specifying a number and arrangement of visual cells in which respective of the videos are visually renderable; associating individual ones of the captured performances, including the respective performer vocals and coordinated videos, to respective ones of the visual cells; and rendering the coordinated audiovisual work, in accordance with the visual progression and the associations, as an audio mix and coordinated visual presentation of the captured performances.

In some cases or embodiments, successive ones of the templated screen layouts vary spatial arrangement or number, or both spatial arrangement and number, of the visual cells. In some cases or embodiments, the audio mix includes, in correspondence with a particular tem plated screen layout operant at a given point in the visual progression, performer vocals for respective ones of captured performances that have been associated to visual cells of the templated screen layout then operant. In some cases or embodiments, at a given temporal point in the audio mix, the included performer vocals are only those performer vocals for a respective captured performance associated to a visual cell of the, then operant, templated screen layout.

In the visual progression employed in some cases or embodiments, at least some transitions from one tem plated screen layout to another temporally coincide with boundaries between musical sections. In the visual progression employed in some cases or embodiments, at least some transitions from one templated screen layout to another temporally coincide with a transition between respective parts selected from the set of: a first vocal part; a second vocal part; and a multi-vocalist part. In the visual progression employed in some cases or embodiments, at least some transitions from one templated screen layout to another temporally coincide with an $N^{th}$ beat cadence, N≥1, of a underlying song to which the seed corresponds. In the visual progression employed in some cases or embodiments, the number of visual cells in at least some successive templated screen layouts increases in correspondence with intensity of an underlying song to which the seed corresponds. In the visual progression employed in some cases or embodiments, the spatial arrangement or sizing of a least some visual cells changes from one tem plated screen layout to a next-in-succession templated screen layout.

In some embodiments, the method further includes generating the visual progression from a structured musical arrangement corresponding to the seed. In some cases or embodiments, structured musical arrangement includes an encoding of musical sections in correspondence with either or both of: a pitch track for performer vocals; and lyrics for performer vocals. In the visual progression employed in some cases or embodiments, at least some transitions from one templated screen layout to another temporally coincide with boundaries between the musical sections of the structured musical arrangement. In cases or embodiments, the structured musical arrangement includes an encoding of a backing track. In the visual progression employed in some cases or embodiments, at least some transitions from one templated screen layout to another temporally coincide with an $N^{th}$ beat cadence, N≥1, computationally extracted from the backing track.

In some cases or embodiments, the templated screen layouts each define visual extents for a set of visual cells in which video captured in correspondence with vocals of respective ones of the performers is rendered. In some cases or embodiments, templated screen layouts include: at least one one-performer layout; at least one two-performer layout; plural three- and four-performer layouts; and for at least one number of performers N, wherein N≥4, plural N-performer layouts.

In some embodiments, the method further includes transitioning, in correspondence with the retrieved visual progression, from a first templated screen layout to a next-in-succession templated screen layout, wherein for video captured in correspondence with vocals of a particular performer, the transition is from first visual cell of the first layout to a second visual cell of the next-in-succession layout. In some cases or embodiments, the first visual cell to second visual cell transition includes one or more of: a sliding transition; a fade in or fade out transition; a scaling transition; and a cropping transition.

In some cases or embodiments, the rendering is to an audiovisual encoding or container format suitable for storage or transmission over the communication network. In some cases or embodiments, the rendering is to a display and audio transducer.

In some embodiments, the method further includes in the audio mix, scaling audio amplitude of performer vocals for captured performances that have been associated to particular visual cells of the templated screen layout then operant, wherein the scaled amplitude for a particular performer's vocals is in correspondence with size of the particular visual cell to which that particular performer's video is associated. In some embodiments, the method further includes panning (left-to-right), in the audio mix, performer vocals for captured performances that have been associated to particular visual cells of the tem plated screen layout then operant, wherein the panning for a particular performer's vocals is in correspondence with lateral placement of the particular visual cell to which that particular performer's video is associated.

In some embodiments, the method further includes transmitting an encoding of the coordinated audiovisual work to one or more of the geographically distributed performers. In some embodiments, the method further includes receiving via the communication network, an audiovisual encoding of a seed performance including first performer vocals and temporally synchronized video captured at a first remote device against an audible rendering of a backing track, wherein the seed includes the seed performance of the first performer.

These and other embodiments in accordance with the present invention(s) will be understood with reference to the description and appended claims which follow.

BRIEF DESCRIPTION OF THE DRAWINGS

The present invention is illustrated by way of example and not limitation with reference to the accompanying figures, in which like references generally indicate similar elements or features.

FIG. 5 illustrates a score coding, in accordance with some embodiments of the present invention(s), in which a visual progression of templated screen layouts is coded in addition to (but in correspondence with) lyrics, pitch-tracks for vocal cues and/or continuous pitch correction of captured user vocals, and a backing track.

Figure 1:
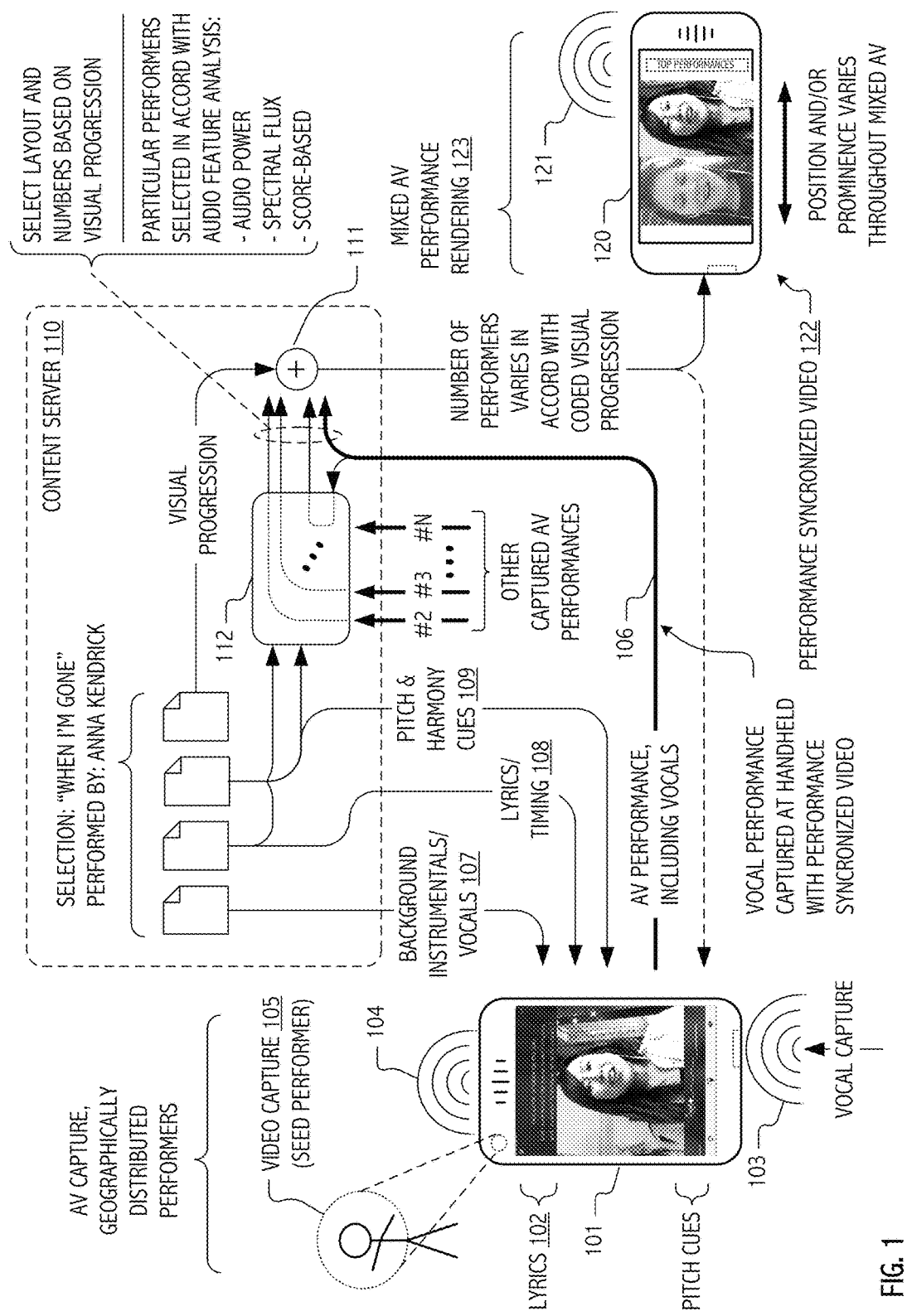
FIG. 1 depicts information flows amongst illustrative mobile phone-type portable computing devices and a content server in accordance with some embodiments of the present invention(s) in which a seed performance is captured and mixed with contributions of additional performers.

Skilled artisans will appreciate that elements or features in the figures are illustrated for simplicity and clarity and have not necessarily been drawn to scale. For example, the dimensions or prominence of some of the illustrated elements or features may be exaggerated relative to other elements or features in an effort to help to improve understanding of embodiments of the present invention.

DESCRIPTION

Techniques have been developed to facilitate the capture, pitch correction, harmonization, encoding and/or rendering of audiovisual performances on portable computing devices and living room-style entertainment equipment. Vocal audio together with performance synchronized video is captured and coordinated with audiovisual contributions of other users to form duet-style or glee club-style or window-paned music video-style audiovisual performances. In some cases, the vocal performances of individual users are captured (together with performance synchronized video) on mobile devices, television-type display and/or set-top box equipment in the context of karaoke-style presentations of lyrics in correspondence with audible renderings of a backing track. In some cases, pitch cues may be presented to vocalists in connection with the karaoke-style presentation of lyrics and, optionally, continuous automatic pitch correction (or pitch shifting into harmony) may be provided.

Contributions of multiple vocalists are coordinated and mixed in a manner that selects for presentation, at any given time along a given performance timeline, performance synchronized video of one or more of the contributors. Selections are in accord with a visual progression that codes a sequence of visual layouts in correspondence with other coded aspects of a performance score such as pitch tracks, backing audio, lyrics, sections and/or vocal parts. The number, visual arrangement and sizing of individual visual cells in such layouts varies throughout the course of a given coordinated performance.

In general, for a given song, aspects of the song's musical structure are used to create a mapped sequence of visual layouts. For example, in some cases, situations or embodiments, song form, such as {verse, chorus, verse, chorus, bridge . . . }, is used to constrain the mapping. In some cases, such as in a duet, vocal part sequencing (e.g., you sing a line, I sing a line, you sing two words, I sing three, we sing together . . . ) provides structural information that is used to create a sequence of visual layouts. In some cases, situations or embodiments, building intensity of a song (e.g., as measured by acoustic power, tempo or some other measure) can result in a sequence of visual layouts that adds greater and greater numbers of vocalists in correspondence with measured intensity.

In some cases, situations or embodiments, selection of particular contributions, mapping of video to a particular visual cell of a coordinated screen layout and/or prominent presentation of particular performance synchronized video and/or audio may be based, at least in part, on computationally-defined audio features extracted from (or computed over) captured vocal audio. Likewise, in some cases, situations or embodiments, selection of particular contributions, mapping of video to a particular visual cell of a coordinated screen layout and/or prominent presentation of particular performance synchronized video and/or audio may be based, at least in part, on computationally-defined video features extracted from (or computed over) captured video.

In correspondence with positioning and/or prominence of particular performance synchronized video, operative audio mix settings may be correspondingly tailored. For example, in some cases, situations or embodiments, spatialization filters may be employed to pan captured audio right and left in correspondence with a current screen layout position for corresponding video. Likewise, spatialization filters may be used to alter captured audio in correspondence with (i) a higher (or lower) current screen layout position of a particular visual cell in which corresponding video is presented and/or (ii) an apparent depth of vocalist stacking. For example, for captured vocals that are mapped to chorus, some embodiments apply greater reverberation to those vocals for which video is presented in a smaller (and apparently more distant) visual cell.

Optionally, and in some cases or embodiments, vocal audio can be pitch-corrected in real-time at the mobile device (or more generally, at a portable computing device such as a mobile phone, personal digital assistant, laptop computer, notebook computer, pad-type computer or netbook) in accord with pitch correction settings. In some cases, pitch correction settings code a particular key or scale for the vocal performance or for portions thereof. In some cases, pitch correction settings include a score-coded melody and/or harmony sequence supplied with, or for association with, the lyrics and backing tracks. Harmony notes or chords may be coded as explicit targets or relative to the score-coded melody or even actual pitches sounded by a vocalist, if desired. Machine usable musical instrument digital interface-style (MIDI-style) codings may be employed for lyrics, backing tracks, note targets, vocal parts (e.g., vocal part 1, vocal part 2, . . . together), musical section information (e.g., intro/outro, verse, pre-chorus, chorus, bridge, transition and/or other section codings), etc. In some cases or embodiments, conventional MIDI-style codings may be extended to also encode a score-aligned, visual progression of mappings to visual cells of a succession of template screen layouts, as illustrated and described herein.

Based on the compelling and transformative nature of pitch-corrected vocals, performance synchronized video and score-coded harmony mixes, user/vocalists may overcome an otherwise natural shyness or angst associated with sharing their vocal performances. Instead, even geographically distributed vocalists are encouraged to share with friends and family or to collaborate and contribute vocal performances as part of social music networks. In some implementations, these interactions are facilitated through social network- and/or eMail-mediated sharing of performances and invitations to join in a group performance. Using uploaded vocals captured at clients such as the aforementioned portable computing devices, a content server (or service) can mediate such coordinated performances by manipulating and mixing the uploaded audiovisual content of multiple contributing vocalists. Depending on the goals and implementation of a particular system, in additional to video content, uploads may include pitch-corrected vocal performances (with or without harmonies), dry (i.e., uncorrected) vocals, and/or control tracks of user key and/or pitch correction selections, etc.

Social music can be mediated in any of a variety of ways. For example, in some implementations, a first user's vocal performance, captured against a backing track at a portable computing device and typically pitch-corrected in accord with score-coded melody and/or harmony cues, is supplied, as a seed performance, to other potential vocal performers. Performance synchronized video is also captured and may be supplied with the pitch-corrected, captured vocals. The supplied vocals are typically mixed with backing instrumentals/vocals and form the backing track for capture of a second (and potentially successive) user's vocals. Often, the successive vocal contributors are geographically separated and may be unknown (at least a priori) to each other, yet the intimacy of the vocals together with the collaborative experience itself tends to minimize this separation. As successive vocal performances and video are captured (e.g., at respective portable computing devices) and accreted as part of the social music experience, the backing track against which respective vocals are captured may evolve to include previously captured vocals of other contributors. Generally speaking, a first, second or $N^{th}$ generation audiovisual performance may be employed as a seed, although for simplicity of description, many of the examples and illustrations herein assume a $1^{st}$ generation seed.

In some cases, captivating visual animations and/or facilities for listener comment and ranking, as well as duet, glee club or choral group formation or accretion logic are provided in association with an audible rendering of a vocal performance (e.g., that captured and pitch-corrected at another similarly configured mobile device) mixed with backing instrumentals and/or vocals. Synthesized harmonies and/or additional vocals (e.g., vocals captured from another vocalist at still other locations and optionally pitch-shifted to harmonize with other vocals) may also be included in the mix. Geocoding of captured vocal performances (or individual contributions to a combined performance) and/or listener feedback may facilitate animations or display artifacts in ways that are suggestive of a performance or endorsement emanating from a particular geographic locale on a user manipulable globe. In this way, implementations of the described functionality can transform otherwise mundane mobile devices into social instruments that foster a sense of global connectivity, collaboration and community.

Karaoke-Style Vocal Performance Capture

Although embodiments of the present invention are not limited thereto, pitch-corrected, karaoke-style, vocal capture using mobile phone-type and/or television-type audiovisual equipment provides a useful descriptive context. For example, in some embodiments such as illustrated in FIG. 1, an iPhone® handheld available from Apple Inc. (or more generally, handheld 101) hosts software that executes in coordination with a content server 110 to provide vocal capture and continuous real-time, score-coded pitch correction and harmonization of the captured vocals. Performance synchronized video may be captured using a camera provided by, or in connection with, a television or other audiovisual media device or connected set-top box equipment (not separately shown in FIG. 1) such as an Apple TV™ device. Performance synchronized video may also, or alternatively, be captured using an on-board camera provided by handheld 101.

As is typical of karaoke-style applications (such as the Sing! Karaoke™ app available from Smule, Inc.), a backing track of instrumentals and/or vocals can be audibly rendered for a user/vocalist to sing against. In such cases, lyrics may be displayed (102) in correspondence with the audible rendering so as to facilitate a karaoke-style vocal performance by a user. In the illustrated configuration of FIG. 1, lyrics, timing information, pitch and harmony cues, backing tracks (e.g., instrumentals/vocals), performance coordinated video, etc. may all be sourced from a network-connected content server 110. In some cases or situations, backing audio and/or video may be rendered from a media store such as an iTunes™ library or other audiovisual content store resident or accessible from the handheld, a set-top box, media streaming device, etc.

Figure 9:
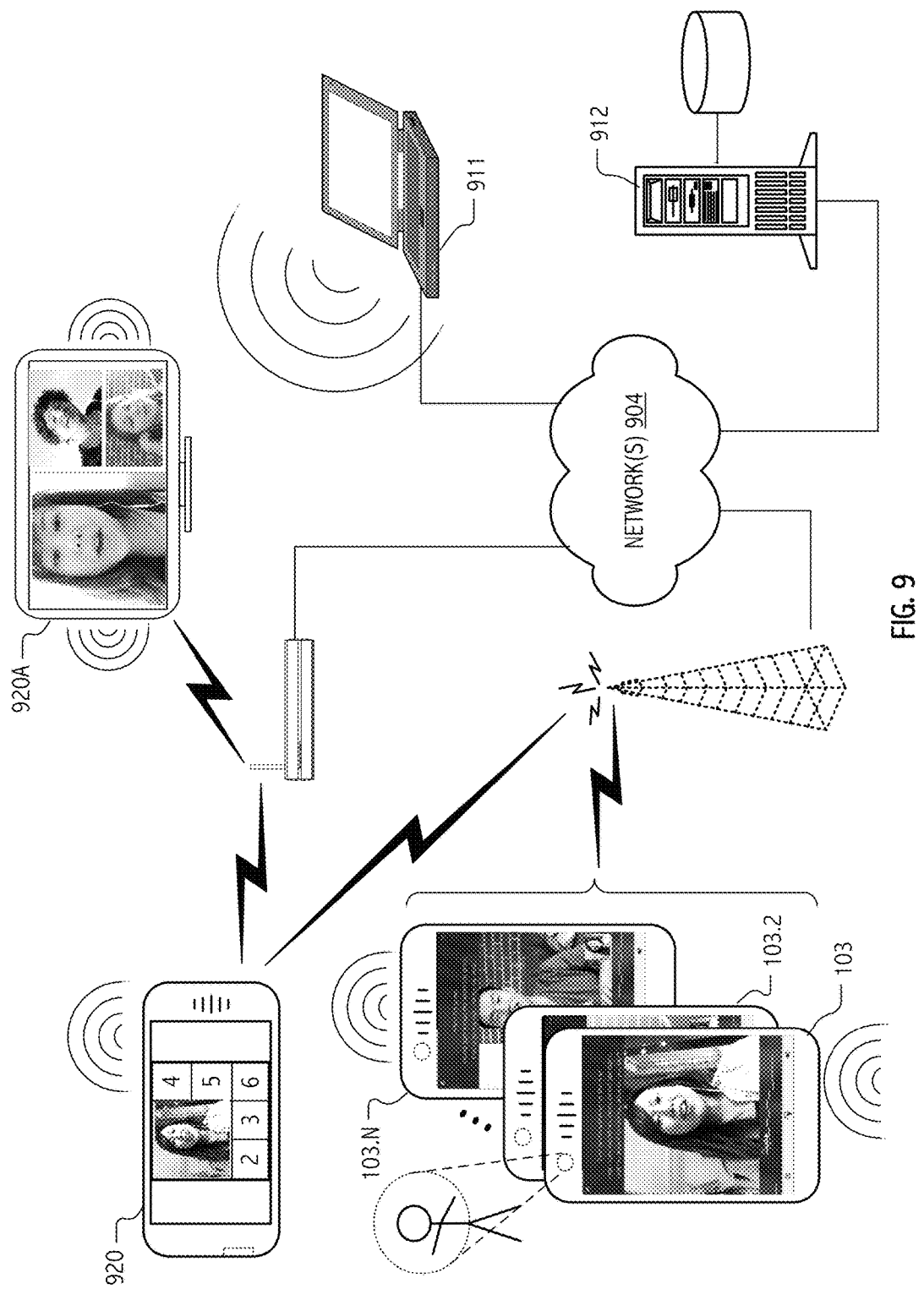
FIG. 9 is a network diagram that illustrates cooperation of exemplary devices in accordance with some embodiments of the present invention(s).

For simplicity, a wireless local area network may be assumed to provide communications between handheld 101, any audiovisual and/or set-top box equipment and a wide-area network gateway to hosted service platforms such as content server 110. FIG. 9 depicts an exemplary network configuration. However, based on the description herein, persons of skill in the art will recognize that any of a variety of data communications facilities, including 802.11 Wi-Fi, Bluetooth™, 4G-LTE wireless, wired data networks, wired or wireless audiovisual interconnects such as in accord with HDMI, AVI, Wi-Di standards or facilities may employed, individually or in combination to facilitate communications and/or audiovisual rendering described herein.

Referring again to the example of FIG. 1, user vocals 103 are captured at handheld 101, and optionally pitch-corrected continuously and in real-time either at the handheld or using computational facilities of audiovisual display and/or set-top box equipment (not specifically shown) and audibly rendered (see 104) mixed with the backing track to provide the user with an improved tonal quality rendition of his/her own vocal performance. Note that while captured vocals 103 and audible rendering 104 are illustrated using a convenient visual symbology that is centric on microphone and speaker facilities of handheld 101, persons of skill in the art having benefit of the present disclosure will appreciate that, in many cases, microphone and speaker functionality may be provided using attached or wirelessly-connected ear buds, headphones, speakers, feedback isolated microphones, etc. Accordingly, unless specifically limited, vocal capture and audible rendering should be understood broadly and without limitation to a particular audio transducer configuration.

Pitch correction, when provided, is typically based on score-coded note sets or cues (e.g., pitch and harmony cues 105), which provide continuous pitch-correction algorithms with performance synchronized sequences of target notes in a current key or scale. In addition to performance synchronized melody targets, score-coded harmony note sequences (or sets) can provide pitch-shifting algorithms with additional targets (typically coded as offsets relative to a lead melody note track and typically scored only for selected portions thereof) for pitch-shifting to harmony versions of the user's own captured vocals. In some cases, pitch correction settings may be characteristic of a particular artist such as the artist that originally performed (or popularized) vocals associated with the particular backing track.

In addition, lyrics, melody and harmony track note sets and related timing and control information may be encapsulated as a score coded in an appropriate container or object (e.g., in a Musical Instrument Digital Interface, MIDI, or Java Script Object Notation, json, type format) for supply together with the backing track(s). Using such information, handheld 101, audiovisual display and/or set-top box equipment, or both, may display lyrics and even visual cues related to target notes, harmonies and currently detected vocal pitch in correspondence with an audible performance of the backing track(s) so as to facilitate a karaoke-style vocal performance by a user. Thus, if an aspiring vocalist selects "When I'm Gone" as popularized by Anna Kendrick, gone.json and gone.m4a may be downloaded from content server 110 (if not already available or cached based on prior download) and, in turn, used to provide background music, synchronized lyrics and, in some situations or embodiments, score-coded note tracks for continuous, real-time pitch-correction while the user sings.

Optionally, at least for certain embodiments or genres, harmony note tracks may be score coded for harmony shifts to captured vocals. Typically, a captured pitch-corrected (possibly harmonized) vocal performance together with performance synchronized video is saved locally, on the handheld device or set-top box, as one or more audiovisual files and is subsequently compressed and encoded for upload (106) to content server 110 as an MPEG-4 container file. MPEG-4 is an international standard for the coded representation and transmission of digital multimedia content for the Internet, mobile networks and advanced broadcast applications. Other suitable codecs, compression techniques, coding formats and/or containers may be employed if desired.

Depending on the implementation, encodings of dry vocals and/or pitch-corrected vocals may be uploaded (106) to content server 110. In general, such vocals (encoded, e.g., in an MPEG-4 container or otherwise) whether already pitch-corrected or pitch-corrected at content server 110 can then be mixed (111), e.g., with backing audio and other captured (and possibly pitch-shifted) vocal performances, to produce files or streams of quality or coding characteristics selected accord with capabilities or limitations a particular target or network (e.g., handheld 120, audiovisual display and/or set-top box equipment, a social media platform, etc.).

As further detailed herein, performances of multiple vocalists (including performance synchronized video) may be accreted and combined, such as to present as a duet-style performance, glee club, window-paned music video-style composition or vocal jam session. In some embodiments, a performance synchronized video contribution (for example, in the illustration of FIG. 1, performance synchronized video 122 including a seed performance captured at handheld 101 or using audiovisual and/or set-top box equipment) may be presented in the resulting mixed audiovisual performance rendering 123 with screen positioning, sizing, or other visual prominence dynamically varied throughout the mixed audiovisual performance rendering 123. A visual progression of the positioning, sizing, or other visual prominence is based at least in part on a succession of templated screen layouts as explained in greater detail herein.

For simplicity of the initial illustration, FIG. 1 depicts performance synchronized audio (103) and video (105) capture of an initial seed performance 106 that is uploaded to content server 110 (or service platform) and serves as a seed performance that is distributed to one or more potential contributing vocalists or performers and against which the other contributing vocalists or performers (#2, #3 #N) capture additional audiovisual (AV) performances. FIG. 1 depicts the supply of other captured AV performances #2, #3 . . . #N for audio mix and visual arrangement 111 at content server 110 to produce performance synchronized video 122.

Figure 2:
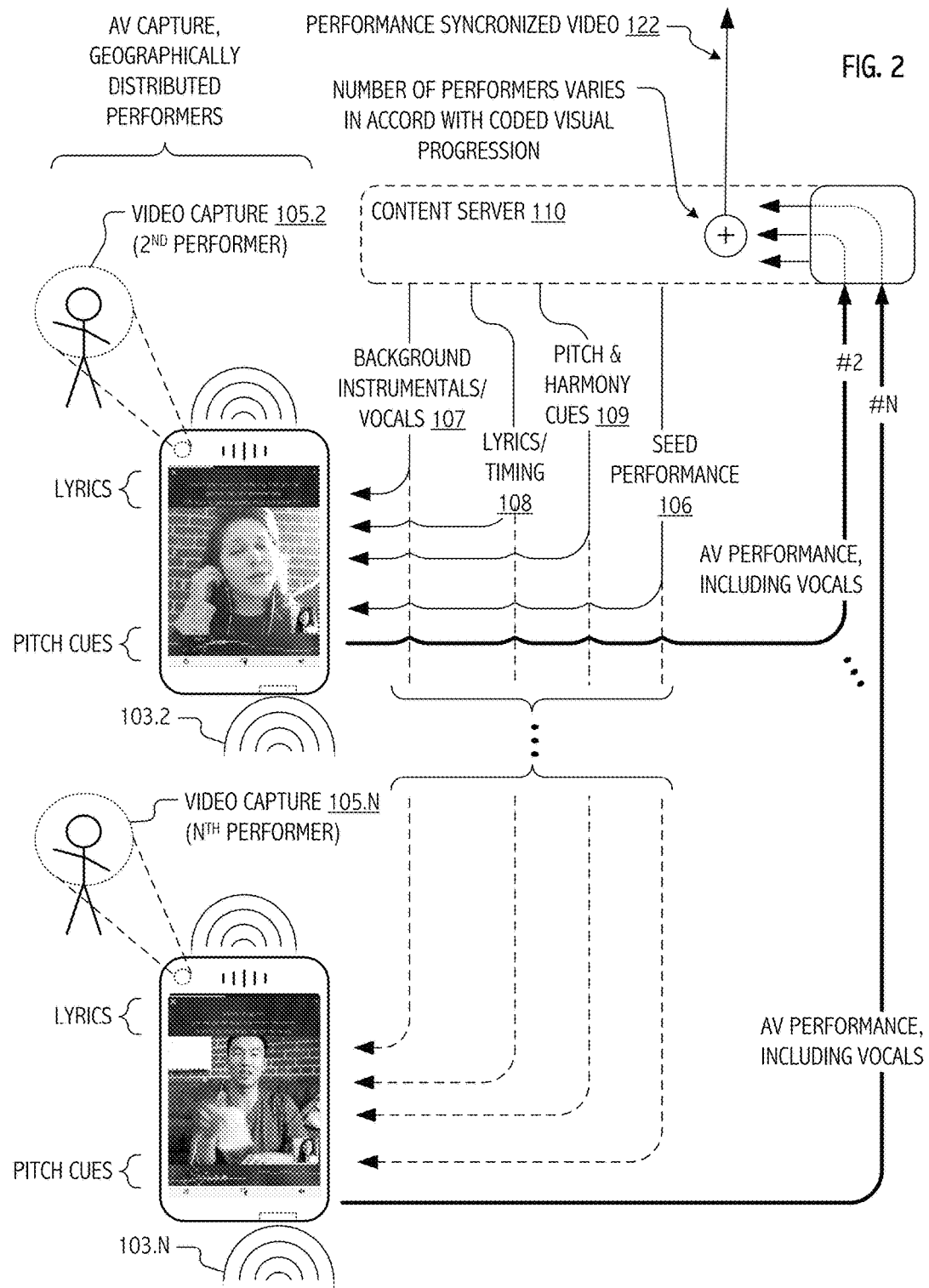
FIG. 2 depicts information flows amongst illustrative mobile phone-type portable computing devices employed for audiovisual content capture and using a content server for audio-visual performance accretion in accordance with some embodiments of the present invention(s).

FIG. 2 depicts in somewhat expanded detail, the supply of background instrumentals/vocals 107, lyrics/timing information 108, pitch and harmony cues 109 and the seed performance 106 to additional vocalists or performers (#2 . . . #N). Such additional vocalists or performers are typically distributed geographically and, in some cases, may have never met in person. As with the first, or seed, performer, audio (103.2 . . . 103.N) and video (105.2 . . . 105.N) capture for the $2^{nd}$ . . . $N^{th}$ performers may be provided in a karaoke-style using a handheld, audiovisual display and/or set-top box equipment, or both in the manner described above. Note that while the illustration of FIGS. 1 and 2 assumes initial seed performance capture using a handheld (101) or living room-style audiovisual display and/or set-top box equipment, persons of skill in the art have benefit of this disclosure will appreciate that studio equipment, or even existing music video content, may in some cases or embodiments be used as a seed performance 106.

Captured AV performances (#2 #N) including vocals for the $2^{nd}$ . . . $N^{th}$ performers are supplied to content server 110 where they are combined with other AV performances (typically including the seed performance) and supplied or presented (e.g., at handheld 120) as a performance synchronized audiovisual composite 122. Referring again to FIG. 1 and in general, the number of performance visuals (and corresponding audio), the layout, individual performer visual positioning and/or prominence, etc. may all be varied throughout the mixed audiovisual performance rendering 123 in accord with a coded visual progression.

In the pictorial illustration of FIG. 1, two performers (of two, three or more from whom AV performances have been captured, e.g., #2, #3 . . . ) are selected based on a current state of the coded visual progression. However, persons of skill in the art having benefit of the present disclosure will understand that, at any given time, different numbers, selections, arrangements and/or visual layouts of performers, may appear in the mixed audiovisual performance rendering 123 based on the coded visual progression. In general, a coded visual progression codes, in temporal alignment with vocal part sequencing or other musical structure of an underlying background track against which AV performances have been captured, or is otherwise selective for changes in the number of presented performers and positional layouts on screen. Particular performers may, in some cases or embodiments, be selected for inclusion (or selected for prominence) based on audio (or visual) feature analysis of corresponding vocals (or video).

In some embodiments of the present invention, social network constructs may facilitate pairings or groupings of geographically-distributed vocalists. For example, relative to FIG. 1, a first vocalist may perform in a manner captured (with vocal audio and performance synchronized video) and uploaded (106) to a content server or service platform. Such captured audiovisual content may, in turn, be distributed to social media contacts of the first vocalist, via an open call mediated by the content server, or by electronic communication initiated by the first vocalist. In this way, the first vocalist herself (and/or the content server or service platform on her behalf) may invite others to join in a coordinated audiovisual performance.

An audiovisual capture such as illustrated and described may include vocals (typically pitch-corrected vocals) and performance synchronized video captured from an initial, or prior, contributor. Such an audiovisual capture can be (or can form the basis of) a backing audiovisual track for subsequent audiovisual capture from another (possibly remote) user/vocalist (see e.g., other captured AV performances #2, #3 . . . #N). In general, capture of subsequently performed audiovisual content may be performed locally or at another (geographically separated) handheld device or using another (geographically separated) audiovisual and/or set-top box configuration. In some cases or embodiments, and particularly in conjunction with living-room style, audiovisual display and/or set-top box configuration (such as using a network-connected, Apple TV device and television monitor), initial and successive audiovisual captures of additional performers may be accomplished using a common (and collocated) set of handheld devices and audiovisual and/or set-top box equipment.

Where supply and use of backing tracks is illustrated and described herein, it will be understood that vocals captured, pitch-corrected (and possibly, though not necessarily, harmonized) may themselves be mixed to produce a "backing track" used to motivate, guide or frame subsequent vocal capture. Furthermore, additional vocalists may be invited to sing a particular part (e.g., tenor, part B in duet, etc.) or simply to sing, whereupon content server 110 may pitch shift and place their captured vocals into one or more positions within a duet, quartet or virtual glee club. These and other aspects of performance accretion are described in greater detail in commonly-owned, U.S. Pat. No. 8,983,829, entitled "COORDINATING AND MIXING VOCALS CAPTURED FROM GEOGRAPHICALLY DISTRIBUTED PERFORMERS," and naming Cook, Lazier, Lieber, and Kirk as inventors.

Visual Progression and Templated Screen Layouts

Figure 3:
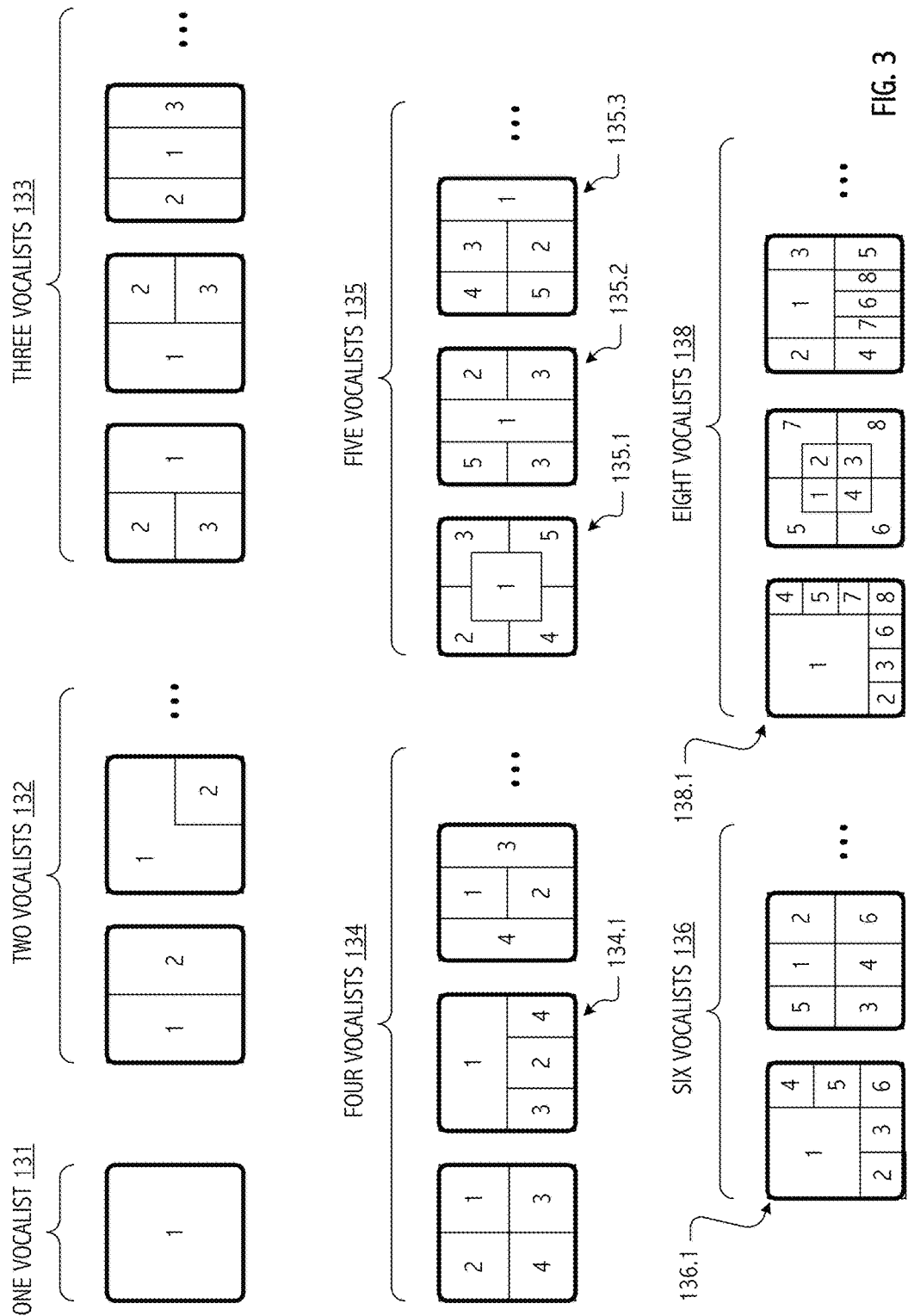
FIG. 3 illustrates templated screen layouts for various numbers of vocalists as may be employed in accordance with some embodiments of the present invention(s) to code a visual progression to be employed in coordination of multiple audio-visual performances.

FIG. 3 illustrates templated screen layouts for various numbers of vocalists as may be employed in accordance with some embodiments of the present invention(s) to code a visual progression to be useful to coordinate multiple audio-visual performances. Exemplary layouts are illustrated for use in the course of a mixed, multi-performer, audiovisual performance (recall mixed AV performance rendering 123, see FIG. 1). Single vocalist (131) and multiple vocalist layouts (132, 133, 134, 135, 136, 138 . . . ) are illustrated, including for at least some numbers of vocalists, multiple alternative layouts. Referring illustratively to the five-vocalist layouts, three alternative layouts 135.1, 135.2 and 135.3 are depicted.

Figure 4A:
FIGS. 4A, 4B and 4C are successive snapshots of vocal performance synchronized video along a coordinated audiovisual performance timeline wherein, in accordance with some embodiments of the present invention(s), video for a plurality of contributing vocalist is coordinated using a visual progression coded in correspondence with a score.
Figure 4B:
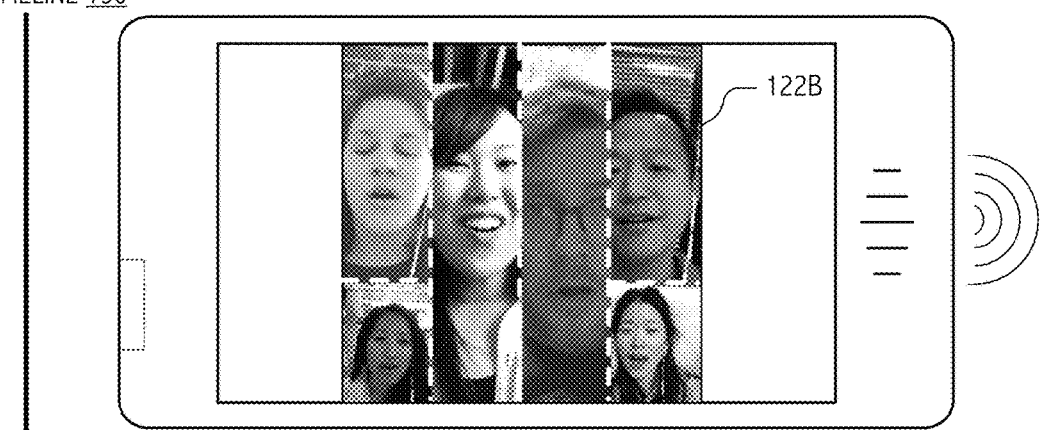
Figure 4C:
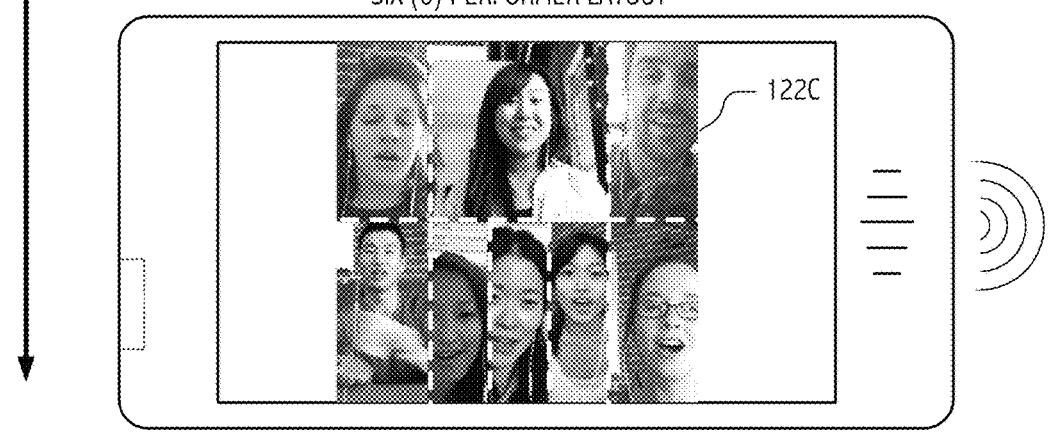

In general, embodiments in accordance with the present invention(s) will employ a variety of layouts throughout a mixed AV performance rendering timeline, including multiple layout variations for a given number of performers, so as to provide visual interest in the resulting mixed AV performance rendering. FIGS. 4A, 4B and 4C depict a series of layouts (122A, 122B and 122C) employed along a coordinated AV performance timeline 130. In some cases, one or more of the layout variations for a given number of performers tends to feature a particular vocalist (or particular vocalists) most (or more) prominently than others. Referring again to FIG. 3, examples of this prominence include layouts 135.1, 136.1 and 138.1, amongst the illustrated five-, six- and eight-vocalist layouts, respectively. As previously described, visual prominence of a particular performer may be determined in accord with audio feature analysis, such as audio power, spectral flux and a score-based quality metric. In some cases or embodiments, a seed performer may be afforded a (or the) prominent visual position.

Although certain exemplary layouts are depicted, persons of skill in the art having benefit of the present disclosure will appreciate numerous suitable variations. Note also that, while generally square form factors with generally-rectangular constituent panes have been illustrated for simplicity, other form factors and paning geometries may be employed in some cases or embodiments. For example, landscape, portrait and letterbox form factors will be desirable in many handheld device deployments.

Score-Coded Visual Progression and Pitch Tracks

FIG. 5 illustrates a score coding, in accordance with some embodiments of the present invention(s), in which a visual progression of templated screen layouts is coded in addition to (but in general temporal correspondence with) lyrics 108, pitch tracks 109 for vocal cues and/or continuous pitch correction of captured user vocals, and a backing track 107. In general, the score-coded visual progression 151 codes a time varying number of performers and is selective for a sequence (152) of visual layouts 153 corresponding with the time-varying number of performers.

Consistent with commonly employed musical composition styles, the overall score is decomposed in musical sections (here, in the example of FIG. 5, depicted as verse, verse, pre-chorus, chorus . . . ) and vocalist count tends to build in the course of typical sections. For example, in verse 161, vocalist count builds from one, to two, to four, to six (then five, then six) and finally up to eight vocalists. An exemplary selection of visual layouts 153 corresponding with the time-varying number of performers is illustrated as a part of sequence 152. Successive ones of the templated screen layouts vary spatial arrangement or number, or both spatial arrangement and number, of the visual cells.

In general, an audio mix in an overall mixed AV performance rendering 123 (recall FIG. 1) includes, in correspondence with a particular templated screen layout operant at a given point in the visual progression, performer vocals for respective ones of captured performances that have been associated to visual cells of the templated screen layout then operant. In some cases or embodiments, at a given temporal point (e.g., point P1) in the score and corresponding audio mix, the included performer vocals are those performer vocals for respective captured performances associated to a visual cell(s) of the, then operant, templated screen layout (e.g., layout L1). Accordingly, in the case of temporal point P1 and corresponding layout L1, six vocals for six performers in the mixed AV performance are rendered together with performance synchronized visuals, and performer 1 (typically the seed performer) is visually featured in prominent position 1 of layout L1.

As will be appreciated by persons of skill in the art having benefit of the present disclosure, at least some transitions from one templated screen layout to another temporally coincide with boundaries between musical sections, while others are internal to a given section. For example, transitions from one templated screen layout to another may temporally coincide with a transition between respective parts such as a first vocal part, a second vocal part, and a multi-vocalist part. Likewise, transitions from one templated screen layout to another may temporally coincide with internal markers within a given section, e.g., verse 161 as illustrated in FIG. 5. In particular, the visual progression employed in some cases or embodiments, particularly within a given section, may temporally coincide with an $N^{th}$ beat cadence, $N \geq 1$, of an underlying song to which the performance corresponds.

In the visual progression employed in some cases or embodiments, the number of visual cells in at least some successive templated screen layouts increases in correspondence with a build intensity of an underlying song to which the seed corresponds. Typically, the spatial arrangement or sizing of a least some visual cells changes from one templated screen layout to a next-in-succession templated screen layout. In some embodiments of the present invention(s), a computer readable coding of a visual progression 151 such as illustrated in FIG. 5 is prepared from a structured musical arrangement corresponding to the backing track or to a seed performance.

Figure 6:
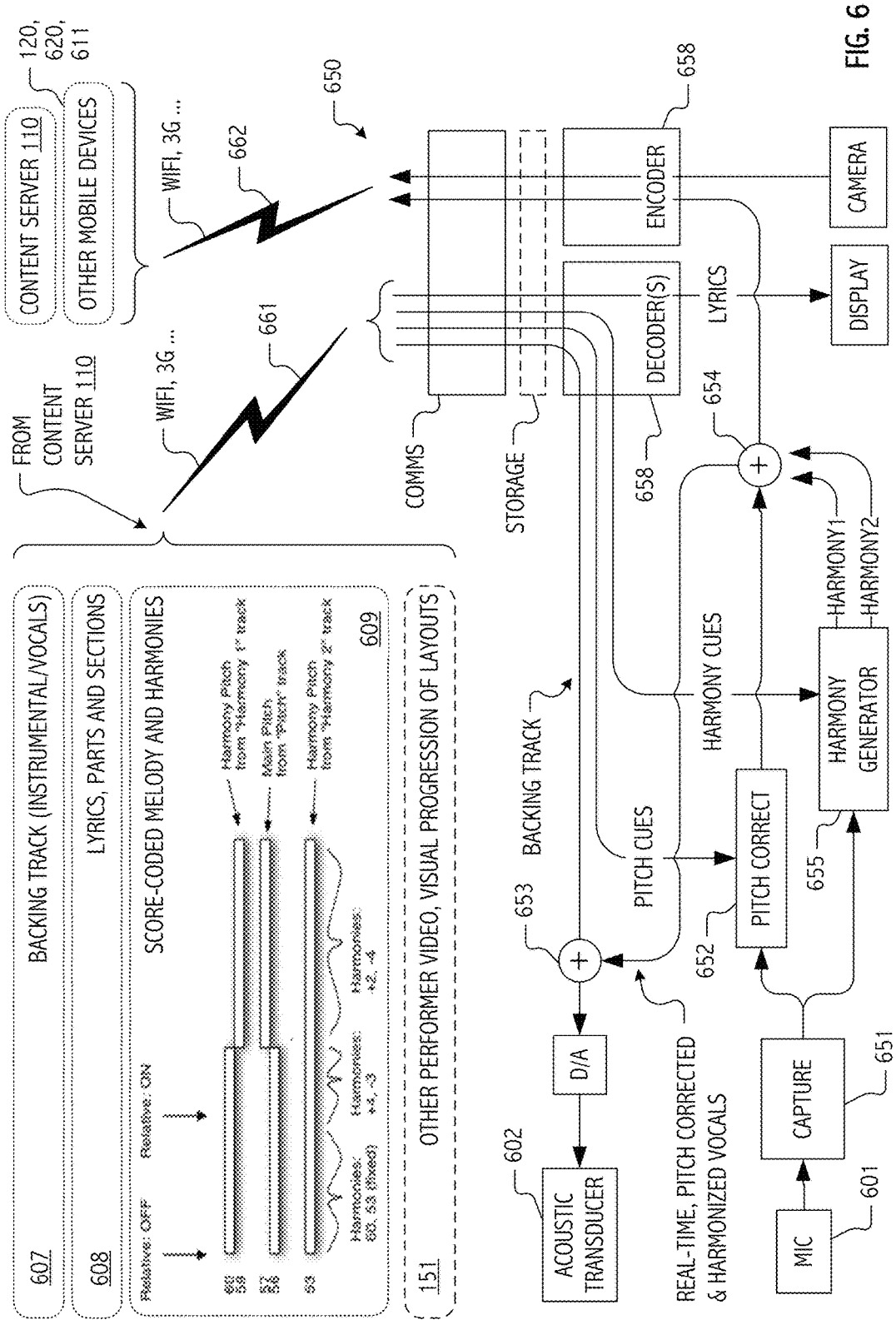
FIG. 6 a flow diagram illustrating, for a captured audiovisual performance, optional real-time continuous pitch-correction and harmony generation based on score-coded pitch correction settings in accordance with some embodiments of the present invention(s).

FIG. 6 a flow diagram illustrating, for a captured audio-visual performance, optional real-time continuous pitch-correction and harmony generation based on score-coded pitch correction settings in accordance with some embodiments of the present invention(s). In the illustrated configuration, a user/vocalist sings along with a backing track karaoke style. Vocals captured (651) from a microphone input 601 are continuously pitch-corrected (652) and harmonized (655) in real-time for mix (653) with the backing track which is audibly rendered at one or more acoustic transducers 202.

Both pitch correction and added harmonies are chosen to correspond to pitch tracks 609 of a musical score, which in the illustrated configuration, is wirelessly communicated (661) to the device(s) (e.g., from content server 110 to handheld 101 or set-top box equipment, recall FIG. 1) on which vocal capture and pitch-correction is to be performed, together with lyrics 608 and an audio encoding of the backing track 607. In some embodiments of techniques described herein, the note (in a current scale or key) that is closest to that sounded by the user/vocalist is determined based on pitch tracks 609 of the musical score. While this closest note may typically be a main pitch corresponding to the score-coded vocal melody, it need not be. Indeed, in some cases, the user/vocalist may intend to sing harmony and the sounded notes may more closely approximate a harmony track.

Thus, a computational determination that a given vocal performance more closely approximates melody or harmony may result in a corresponding determination of visual prominence, such as in a prominent position of a multi-performer visual layout (recall layouts 135.1, 136.1 and 138.1 of FIG. 3, as well as the performer 1 position in layout L1 in the sequence 152 of visual layouts illustrated in FIG. 5). In some modes or embodiments, performance synchronized video corresponding to vocals determined to be (or pitch-corrected to) melody may be visually presented in a generally more prominent manner, while performance synchronized video corresponding to vocals determined to be (or pitch-shifted to) harmony may be visually presented with less prominence.

In the computational flow of FIG. 6, pitch corrected or shifted vocals may be combined (654) or aggregated for mix (653) with an audibly-rendered backing track and/or communicated (662) to content server 110 or a remote device (e.g., handheld 120 or 620, television and/or set-top box equipment, or some other media-capable, computational system 611). In some embodiments, pitch correction or shifting of vocals and resulting determinations of desired visual prominence may be performed at content server 110.

Audiovisual Capture at Handheld Device

Figure 7:
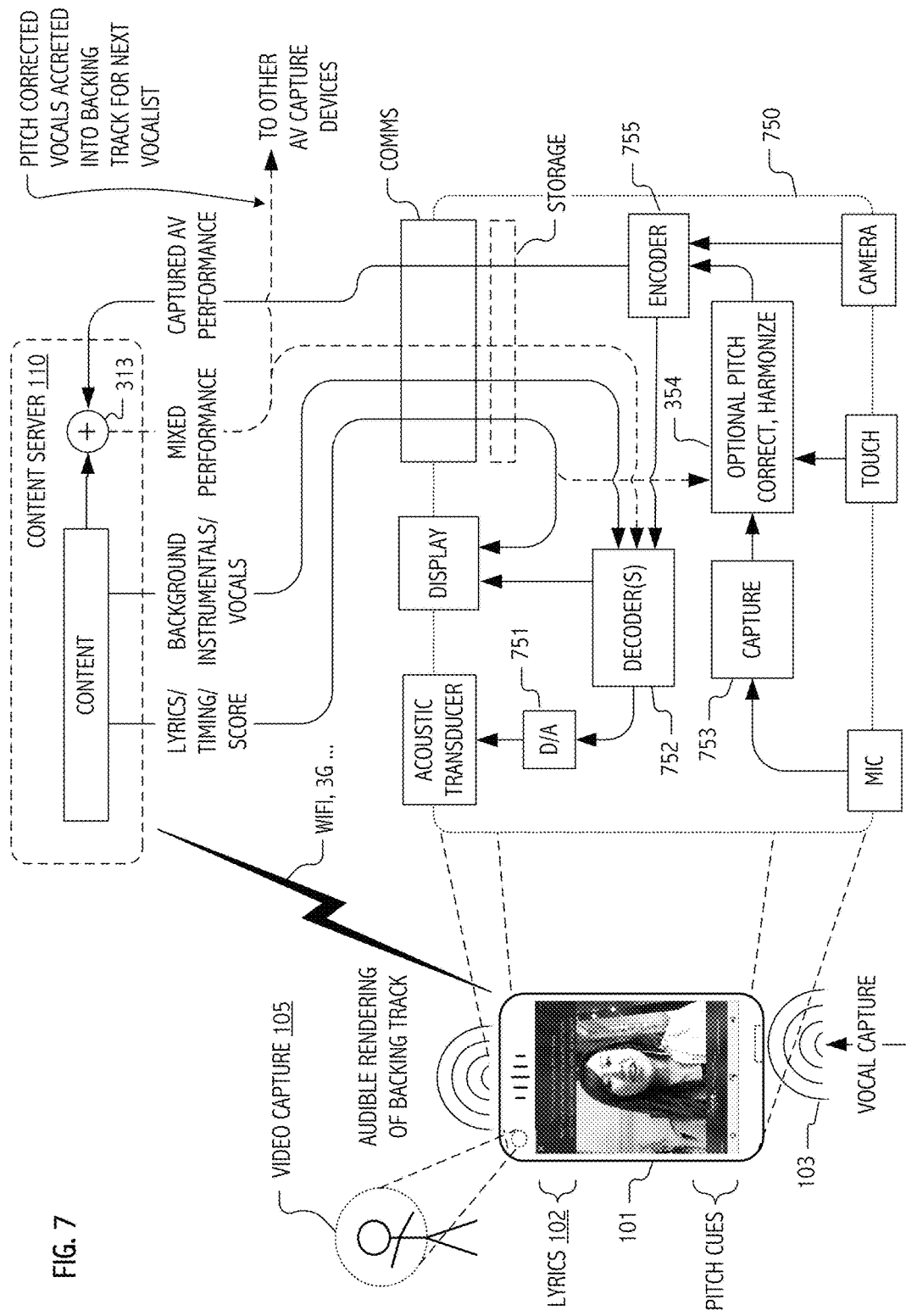
FIG. 7 is a functional block diagram of hardware and software components executable at an illustrative mobile phone-type portable computing device to facilitate processing of a captured audiovisual performance in accordance with some embodiments of the present invention(s).

FIG. 7 is a functional block diagram of hardware and software components executable at an illustrative mobile phone-type portable computing device to facilitate processing of a captured audiovisual performance in accordance with some embodiments of the present invention(s). In some embodiments (recall FIG. 1), capture of vocal audio and performance synchronized video may be performed using facilities of television-type display and/or set-top box equipment. However, in other embodiments, a handheld device (e.g., handheld device 101) may itself support capture of both vocal audio and performance synchronized video. Thus, FIG. 7 illustrates basic signal processing flows (750) in accord with certain implementations suitable for mobile phone-type handheld device 101 to capture vocal audio and performance synchronized video, to generate pitch-corrected and optionally harmonized vocals for audible rendering (locally and/or at a remote target device), and to communicate with a content server or service platform 110.

Based on the description herein, persons of ordinary skill in the art will appreciate suitable allocations of signal processing techniques (sampling, filtering, decimation, etc.) and data representations to functional blocks (e.g., decoder(s) 752, digital-to-analog (D/A) converter 751, capture 753 and encoder 755) of a software executable to provide signal processing flows 750 illustrated in FIG. 7. Likewise, relative to FIG. 6, the signal processing flows 650 and illustrative score coded note targets (including harmony note targets), persons of ordinary skill in the art will appreciate suitable allocations of signal processing techniques and data representations to functional blocks and signal processing constructs (e.g., decoder(s) 658, capture 651, digital-to-analog (D/A) converter 656, mixers 653, 654, and encoder 657) as in FIG. 6, implemented at least in part as software executable on handheld (101) or other portable computing device.

As will be appreciated by persons of ordinary skill in the art, pitch-detection and pitch-correction have a rich technological history in the music and voice coding arts. Indeed, a wide variety of feature picking, time-domain and even frequency-domain techniques have been employed in the art and may be employed in some embodiments in accord with the present invention. With this in mind, and recognizing that visual prominence techniques in accordance with the present inventions are generally independent of any particular pitch-detection or pitch-correction technology, the present description does not seek to exhaustively inventory the wide variety of signal processing techniques that may be suitable in various design or implementations in accord with the present description. Instead, we simply note that in some embodiments in accordance with the present inventions, pitch-detection methods calculate an average magnitude difference function (AMDF) and execute logic to pick a peak that corresponds to an estimate of the pitch period. Building on such estimates, pitch shift overlap add (PSOLA) techniques are used to facilitate resampling of a waveform to produce a pitch-shifted variant while reducing aperiodic effects of a splice. Implementations based on AMDF/PSOLA techniques are described in greater detail in commonly-owned, U.S. Pat. No. 8,983,829, entitled "COORDINATING AND MIXING VOCALS CAPTURED FROM GEOGRAPHICALLY DISTRIBUTED PERFORMERS," and naming Cook, Lazier, Lieber, and Kirk as inventors.

An Exemplary Mobile Device and Network

Figure 8:
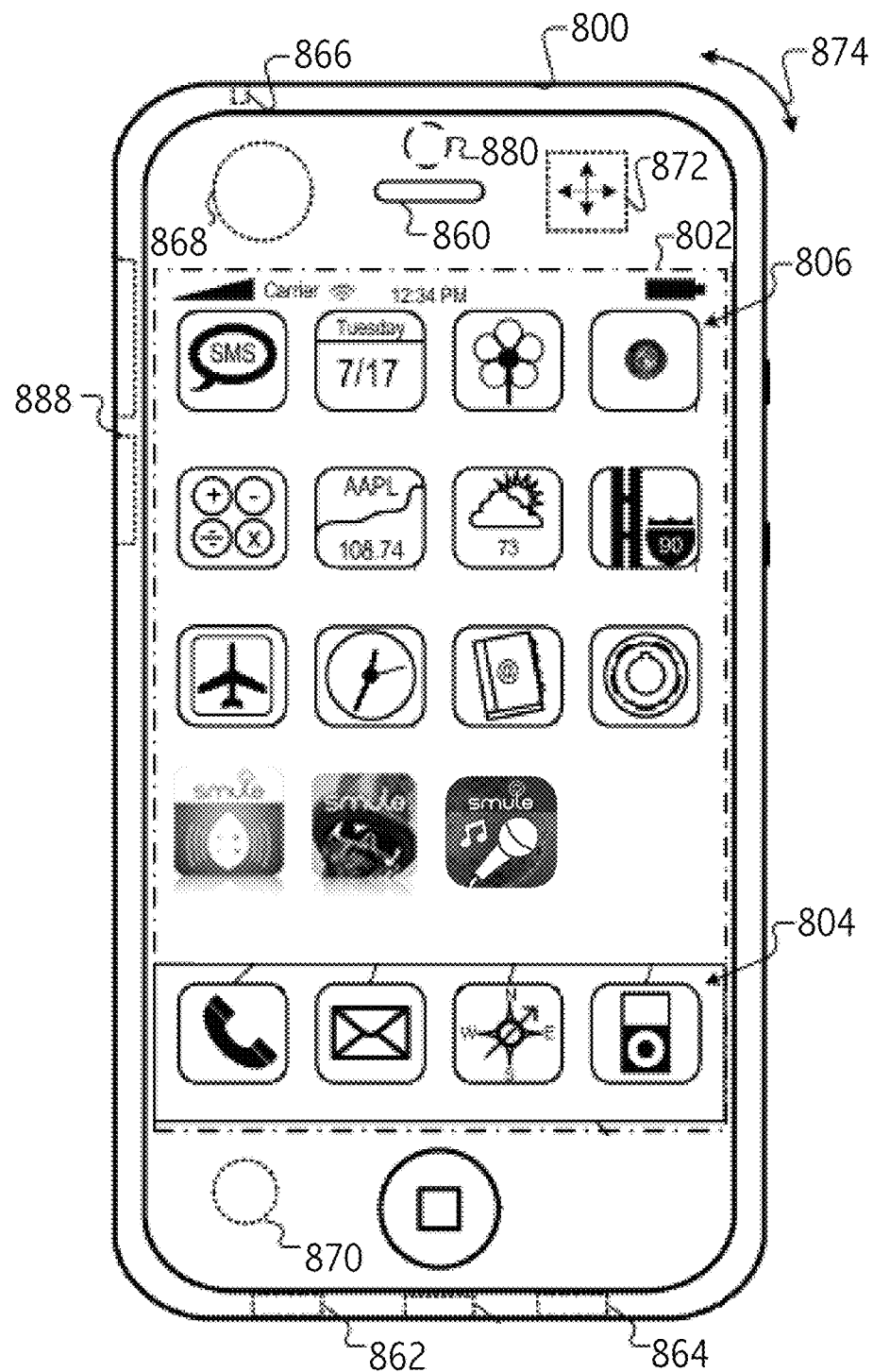
FIG. 8 illustrates features of a mobile device that may serve as a platform for execution of software implementations, including audiovisual capture, in accordance with some embodiments of the present invention(s).

FIG. 8 illustrates features of a mobile device that may serve as a platform for execution of software implementations, including audiovisual capture, in accordance with some embodiments of the present invention(s). In particular, FIG. 8 illustrates features of a mobile device that may serve as a platform for execution of software implementations in accordance with some embodiments of the present invention. More specifically, FIG. 8 is a block diagram of a mobile device 800 that is generally consistent with commercially-available versions of an iPhone™ mobile digital device. Although embodiments of the present invention are certainly not limited to iPhone deployments or applications (or even to iPhone-type devices), the iPhone device platform, together with its rich complement of sensors, multimedia facilities, application programmer interfaces and wireless application delivery model, provides a highly capable platform on which to deploy certain implementations. Based on the description herein, persons of ordinary skill in the art will appreciate a wide range of additional mobile device platforms that may be suitable (now or hereafter) for a given implementation or deployment of the inventive techniques described herein.

Summarizing briefly, mobile device 800 includes a display 802 that can be sensitive to haptic and/or tactile contact with a user. Touch-sensitive display 802 can support multi-touch features, processing multiple simultaneous touch points, including processing data related to the pressure, degree and/or position of each touch point. Such processing facilitates gestures and interactions with multiple fingers and other interactions. Of course, other touch-sensitive display technologies can also be used, e.g., a display in which contact is made using a stylus or other pointing device.

Typically, mobile device 800 presents a graphical user interface on the touch-sensitive display 802, providing the user access to various system objects and for conveying information. In some implementations, the graphical user interface can include one or more display objects 804, 806. In the example shown, the display objects 804, 806, are graphic representations of system objects. Examples of system objects include device functions, applications, windows, files, alerts, events, or other identifiable system objects. In some embodiments of the present invention, applications, when executed, provide at least some of the digital acoustic functionality described herein.

Typically, the mobile device 800 supports network connectivity including, for example, both mobile radio and wireless internetworking functionality to enable the user to travel with the mobile device 800 and its associated network-enabled functions. In some cases, the mobile device 800 can interact with other devices in the vicinity (e.g., via Wi-Fi, Bluetooth, etc.). For example, mobile device 800 can be configured to interact with peers or a base station for one or more devices. As such, mobile device 800 may grant or deny network access to other wireless devices.

Mobile device 800 includes a variety of input/output (I/O) devices, sensors and transducers. For example, a speaker 860 and a microphone 862 are typically included to facilitate audio, such as the capture of vocal performances and audible rendering of backing tracks and mixed pitch-corrected vocal performances as described elsewhere herein. In some embodiments of the present invention, speaker 860 and microphone 862 may provide appropriate transducers for techniques described herein. An external speaker port 864 can be included to facilitate hands-free voice functionalities, such as speaker phone functions. An audio jack 866 can also be included for use of headphones and/or a microphone. In some embodiments, an external speaker and/or microphone may be used as a transducer for the techniques described herein.

Other sensors can also be used or provided. A proximity sensor 868 can be included to facilitate the detection of user positioning of mobile device 800. In some implementations, an ambient light sensor 870 can be utilized to facilitate adjusting brightness of the touch-sensitive display 802. An accelerometer 872 can be utilized to detect movement of mobile device 800, as indicated by the directional arrow 874. Accordingly, display objects and/or media can be presented according to a detected orientation, e.g., portrait or landscape. In some implementations, mobile device 800 may include circuitry and sensors for supporting a location determining capability, such as that provided by the global positioning system (GPS) or other positioning systems (e.g., systems using Wi-Fi access points, television signals, cellular grids, Uniform Resource Locators (URLs)) to facilitate geocodings described herein. Mobile device 800 also includes a camera lens and imaging sensor 880. In some implementations, instances of a camera lens and sensor 880 are located on front and back surfaces of the mobile device 800. The cameras allow capture still images and/or video for association with captured pitch-corrected vocals.

Mobile device 800 can also include one or more wireless communication subsystems, such as an 802.11b/g/n/ac communication device, and/or a Bluetooth™ communication device 888. Other communication protocols can also be supported, including other 802.x communication protocols (e.g., WiMax, Wi-Fi, 3G), fourth generation protocols and modulations (4G-LTE), code division multiple access (CDMA), global system for mobile communications (GSM), Enhanced Data GSM Environment (EDGE), etc. A port device 890, e.g., a Universal Serial Bus (USB) port, or a docking port, or some other wired port connection, can be included and used to establish a wired connection to other computing devices, such as other communication devices 800, network access devices, a personal computer, a printer, or other processing devices capable of receiving and/or transmitting data. Port device 890 may also allow mobile device 800 to synchronize with a host device using one or more protocols, such as, for example, the TCP/IP, HTTP, UDP and any other known protocol.

FIG. 9 is a network diagram that illustrates cooperation of exemplary devices in accordance with some embodiments of the present invention(s). In particular, FIG. 9 illustrates respective instances of handheld devices or portable computing devices such as mobile device 800 employed in audiovisual capture (103, 103.2 . . . 103.N) and programmed with vocal audio and video capture code, user interface code, pitch correction code, an audio rendering pipeline and playback code in accord with the functional descriptions herein. A first device instance is depicted as, for example, employed in a vocal audio and performance synchronized video capture (103) of a seed performance is depicted operating, while device instance 520 operates in a presentation or playback mode for a mixed audiovisual performance with dynamic visual prominence for performance synchronized video. An additional television-type display and/or set-top box equipment 920A is likewise depicted operating in a presentation or playback mode, although as described elsewhere herein, such equipment may also operate as part of a vocal audio and performance synchronized video capture facility. Each of the aforementioned devices communicate via wireless data transport and/or intervening networks 904 with a server 912 or service platform that hosts storage and/or functionality explained herein with regard to content server 110. Captured, pitch-corrected vocal performances with performance synchronized video mixed to present mixed AV performance rendering based on a visual progression of template screen layouts as described herein may (optionally) be streamed and audiovisually rendered at laptop computer 911.

Other Embodiments

While the invention(s) is (are) described with reference to various embodiments, it will be understood that these embodiments are illustrative and that the scope of the invention(s) is not limited to them. Many variations, modifications, additions, and improvements are possible. For example, while particular templated screen layouts, transitions and audio mixing techniques are illustrated and describe, persons of skill in the art having benefit of the present disclosure will appreciate number variations and adaptions suitable for a given deployment, implementation, musical genre or user demographic. Likewise, while pitch correction vocal performances captured in accord with a karaoke-style interface have been described, other variations and adaptations will be appreciated. Furthermore, while certain illustrative signal processing techniques have been described in the context of certain illustrative applications and device/system configurations, persons of ordinary skill in the art will recognize that it is straightforward to modify the described techniques to accommodate other suitable signal processing techniques and effects.

Embodiments in accordance with the present invention may take the form of, and/or be provided as, a computer program product encoded in a machine-readable medium as instruction sequences and other functional constructs of software, which may in turn be executed in a computational system (such as a iPhone handheld, mobile or portable computing device, or content server platform) to perform methods described herein. In general, a machine readable medium can include tangible articles that encode information in a form (e.g., as applications, source or object code, functionally descriptive information, etc.) readable by a machine (e.g., a computer, computational facilities of a mobile device or portable computing device, etc.) as well as tangible storage incident to transmission of the information. A machine-readable medium may include, but is not limited to, magnetic storage medium (e.g., disks and/or tape storage); optical storage medium (e.g., CD-ROM, DVD, etc.); magneto-optical storage medium; read only memory (ROM); random access memory (RAM); erasable programmable memory (e.g., EPROM and EEPROM); flash memory; or other types of medium suitable for storing electronic instructions, operation sequences, functionally descriptive information encodings, etc.

In general, plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A method of preparing a coordinated audiovisual work from geographically distributed performer contributions, the method comprising:
    receiving via a communication network, plural computer readable audiovisual encodings of performances captured at respective remote devices in temporal correspondence with respective audible renderings of a seed, the received audiovisual encodings each including respective performer vocals and temporally synchronized video;
    retrieving a computer readable encoding of a visual progression that encodes, in temporal correspondence with the seed, a succession of templated screen layouts each specifying a number and arrangement of visual cells in which respective of the videos are visually renderable;
    associating individual ones of the captured performances, including the respective audiovisually encoded performer vocals and coordinated videos, to respective ones of the visual cells; and
    computationally rendering the coordinated audiovisual work, in accordance with the visual progression and the associations, as an audio mix and coordinated visual presentation of the captured performances.

2. The method of claim 1,
    wherein successive ones of the templated screen layouts vary spatial arrangement or number, or both spatial arrangement and number, of the visual cells.

3. The method of claim 1,
    wherein the audio mix includes, in correspondence with a particular templated screen layout operant at a given point in the visual progression, performer vocals for respective ones of captured performances that have been associated to visual cells of the templated screen layout then operant.

4. The method of claim 3,
    wherein at a given temporal point in the audio mix, the included performer vocals are only those performer vocals for a respective captured performance associated to a visual cell of the, then operant, templated screen layout.

5. The method of claim 1,
    wherein, in the visual progression, at least some transitions from one templated screen layout to another temporally coincide with boundaries between musical sections.

6. The method of claim 5,
    wherein, in the visual progression, at least some transitions from one templated screen layout to another temporally coincide with a transition between respective parts selected from the set of:
        a first vocal part;
        a second vocal part; and
        a multi-vocalist part.

7. The method of claim 5,
    wherein, in the visual progression, at least some transitions from one templated screen layout to another temporally coincide with an $N^{th}$ beat cadence, $N>1$, of an underlying song to which the seed corresponds.

8. The method of claim 2,
    wherein, in the visual progression, the number of visual cells in at least some successive templated screen layouts increases in correspondence with intensity of an underlying song to which the seed corresponds.

9. The method of claim 2,
    wherein, in the visual progression, the spatial arrangement or sizing of a least some visual cells changes from one templated screen layout to a next-in-succession templated screen layout.

10. The method of claim 1, further comprising:
    generating the visual progression from a structured musical arrangement corresponding to the seed.

11. The method of claim 10,
    wherein structured musical arrangement includes an encoding of musical sections in correspondence with either or both of:
        a pitch track for performer vocals; and
        lyrics for performer vocals.

12. The method of claim 11,
    wherein, in the visual progression, at least some transitions from one templated screen layout to another temporally coincide with boundaries between the musical sections of the structured musical arrangement.

13. The method of claim 10,
    wherein structured musical arrangement includes an encoding of a backing track.

14. The method of claim 13,
    wherein, in the visual progression, at least some transitions from one templated screen layout to another temporally coincide with an $N^{th}$ beat cadence, $N>1$, computationally extracted from the backing track.

15. The method of claim 1,
    wherein the templated screen layouts each define visual extents for a set of visual cells in which video captured in correspondence with vocals of respective ones of the performers is rendered.

16. The method of claim 15, wherein templated screen layouts include:
    at least one one-performer layout;
    at least one two-performer layout;
    plural three- and four-performer layouts; and
    for at least one number of performers N, wherein $N>4$, plural N-performer layouts.

17. The method of claim 1, further comprising:

in correspondence with the retrieved visual progression, transitioning from a first templated screen layout to a next-in-succession templated screen layout, wherein for video captured in correspondence with vocals of a particular performer, the transition is from first visual cell of the first layout to a second visual cell of the next-in-succession layout.

18. The method of claim 15, wherein the first visual cell to second visual cell transition includes one or more of:

a sliding transition;

a fade in or fade out transition;

a scaling transition; and a cropping transition.

19. The method of claim 1, wherein the rendering is to an audiovisual encoding or container format suitable for storage or transmission over the communication network.

20. The method of claim 1, wherein the rendering is to a display and audio transducer.

21. The method of claim 1, further comprising:

in the audio mix, scaling audio amplitude of performer vocals for captured performances that have been associated to particular visual cells of the templated screen layout then operant, wherein the scaled amplitude for a particular performer's vocals is in correspondence with size of the particular visual cell to which that particular performer's video is associated.

22. The method of claim 1, further comprising:

in the audio mix, panning (left-to-right) performer vocals for captured performances that have been associated to particular visual cells of the templated screen layout then operant, wherein the panning for a particular performer's vocals is in correspondence with lateral placement of the particular visual cell to which that particular performer's video is associated.

23. The method of claim 1, further comprising:

transmitting an encoding of the coordinated audiovisual work to one or more of the geographically distributed performers.

24. The method of claim 1, further comprising:

receiving via the communication network, an audiovisual encoding of a seed performance including first performer vocals and temporally synchronized video captured at a first remote device against an audible rendering of a backing track, wherein the seed includes the seed performance of the first performer.

* * * * *